UNITED STATES PATENT OFFICE.

PHILIPP OTT AND THILO KROEBER, OF ELBERFELD, GERMANY, ASSIGNORS TO THE FARBENFABRIKEN OF ELBERFELD COMPANY, OF NEW YORK.

BLUE AZIN DYE AND PROCESS OF MAKING SAME.

SPECIFICATION forming part of Letters Patent No. 606,295, dated June 28, 1898.

Application filed November 23, 1897. Serial No. 659,550. (Specimens.) Patented in England June 16, 1893, No. 11,892; in Germany February 27, 1894, No. 86,224; in France July 7, 1894, No. 230,692, and in Italy July 7, 1894, XXIX, 36,794, LXXII, 187.

*To all whom it may concern:*

Be it known that we, PHILIPP OTT and THILO KROEBER, doctors of philosophy, chemists, of Elberfeld, Germany, (assignors to the FARBENFABRIKEN OF ELBERFELD COMPANY, of New York,) have invented a new and useful Improvement in the Manufacture of Azin Dye, for which the Farbenfabriken, vormals Fr. Bayer & Co., of Elberfeld, Germany, has already obtained Letters Patent in Germany, No. 86,224, dated February 27, 1894; in England, No. 11,892, dated June 16, 1893; in France, No. 230,692, dated July 7, 1894, and in Italy, Reg. Gen., Vol. XXIX, No. 36,794, Reg. Att., Vol. LXXII, No. 187, dated July 7, 1894;) and we hereby declare the following to be a clear and exact description of our invention.

Our invention relates to the production of a new azin dye by acting with oxidizing agents on a mixture of equimolecular proportions of paraämidodiphenylaminorthosulfo-acid of the formula

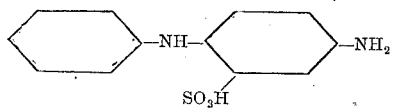

and of a sulfo-acid of symmetrically-disubstituted 1.3 naphthylenediamin having the formula

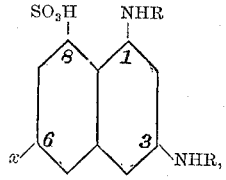

(in which formula R represents the phenyl or tolyl radical x, either a hydrogen atom or a sulfo group.) The dyestuffs thus obtained represent dark powders soluble in water with a blue color and dyeing wool in acid-baths blue shades.

In carrying out our new process practically we can proceed as follows: 19.5 parts, by weight, of diphenylnaphthylene diaminsulfo-acid having the formula

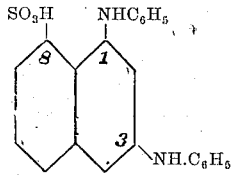

and 13.2 parts, by weight, of paraämidodiphenylaminsulfo-acid are mixed with two hundred parts, by weight, of strong alcohol, 8.2 parts, by weight, of sodium acetate, ($NaH_3C_2O_2$,) and ten parts, by weight, of water. The mixture is heated at about 82° to 85° centigrade. At this temperature a solution, prepared by dissolving 14.75 parts, by weight, of bichromate of soda (corresponding to sixty-eight per cent. $CrO_3$) in twenty-five parts, by weight, of water, is allowed to run into the aforesaid alcoholic mixture under continuous stirring. The formation of the blue dyestuff begins almost immediately and is complete within about five hours. After about twelve hours the mixture has become solid and forms a crystalline mass, which is filtered off and washed with a small quantity of alcohol and then with about three hundred parts, by weight, of water. The residue, which contains the dyestuff, together with some by-products, such as chromium salts, is boiled with two thousand parts, by weight, of water, the chromium oxid is filtered off, and the filtrate is finally acidulated with diluted hydrochloric acid, the free sulfo-acid of the dyestuff being thus separated for the most part. This precipitate may be increased by adding common salt. The dyestuff is filtered off, dried, and pulverized. It forms a darkish-brown powder with bronze-like luster, soluble in water with a splendid blue color, in concentrated sulfuric acid with a green color, which turns into blue on mixing the sulfuric acid with a large quantity of water. It dyes wool in brilliant blue shades fast to the action of alkalies, acids, and likewise fast to milling.

The coloring-matter has most probably the formula

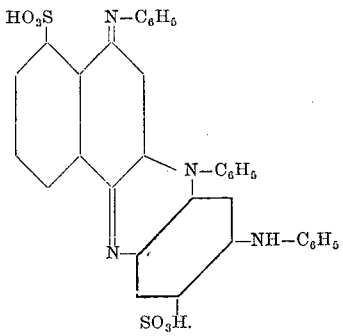

If instead of the diphenylnaphthylenediamin monosulfo-acid the analogous ditolyl compound is used, or, if instead of the 8 monosulfo-acid the analogous diphenyl or ditolyl naphthylenediamin 6.8 disulfo-acid is employed, products are obtained which exhibit very similar chemical and dyeing properties.

In the place of bichromate of sodium other oxidizing agents acting in the same or in a similar manner can be employed in our new process.

Having now described our invention and in what manner the same is to be performed, what we claim as new, and desire to secure by Letters Patent, is—

1. The process for producing new azin dyestuffs by acting with oxidizing agents such as bichromate of sodium on a mixture of equimolecular proportions of paraämidodiphenylaminorthosulfo-acid of the formula

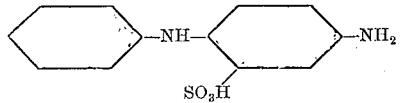

and of a sulfo-acid of a symmetrically-disubstituted 1.3 naphthylene diamin having the formula:

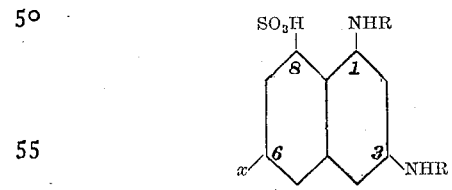

in which formula R represents the phenyl or tolyl radical, $x$ either a hydrogen atom or a sulfo group, substantially as hereinbefore described.

2. The process for producing a new azin dyestuff by acting with oxidizing agents such as bichromate of sodium on a mixture prepared from one molecule of paraämidodiphenylaminsulfo-acid and one molecule of diphenylnaphthylenediaminsulfo-acid having the formula

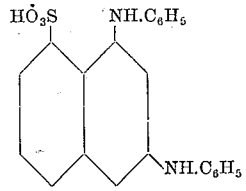

substantially as hereinbefore described.

3. As new articles of manufacture azin dyestuffs obtainable from paraämidodiphenylaminsulfo-acid and sulfo-acids of symmetrically-disubstituted 1.3 naphthylenediamins having the general formula

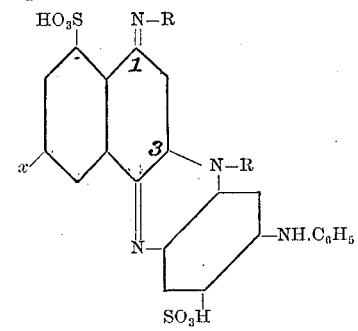

R and $x$ representing in this formula the substituents hereinbefore defined being dark powders, soluble in water with a blue color and dyeing wool in acid-baths blue shades substantially as described.

4. As a new article of manufacture the specific azin dyestuff obtainable from paraämidodiphenylaminsulfo-acid and diphenylnaphthylenediaminsulfo-acid having the formula

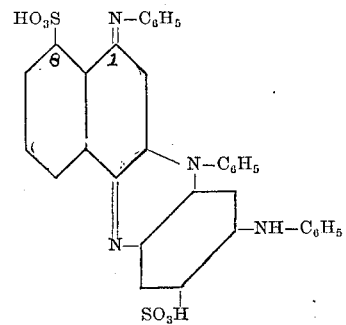

representing a darkish-brown powder, soluble in water with a splendid blue color, in concentrated sulfuric acid with a green color which turns into blue on mixing the sulfuric acid with a large quantity of water, dyeing wool brilliant-blue shades fast to the action of alkalies, of acids and likewise fast against milling substantially as described.

In testimony whereof we have signed our names in the presence of two subscribing witnesses.

PHILIPP OTT.
THILO KROEBER.

Witnesses:
R. E. JAHN,
OTTO KÖNIG.

Correction in Letters Patent No. 606,295.

It is hereby certified that in Letters Patent No. 606,295, granted June 28, 1898, upon the application of Philipp Ott and Thilo Kroeber, of Elberfeld, Germany, for an improvement in "Blue Azin Dyes and Processes of Making Same," an error appears in the printed specification requiring correction, as follows: In line 41, page 1, the comma after the letter "$x$" should be stricken out and inserted after the word "radical" in same line instead; and that the said Letters Patent should be read with this correction therein that the same may conform to the record of the case in the Patent Office.

Signed, countersigned, and sealed this 12th day of July, A. D., 1898.

[SEAL.]

WEBSTER DAVIS,
*Assistant Secretary of the Interior.*

Countersigned:
C. H. DUELL,
*Commissioner of Patents.*